US008387378B2

(12) United States Patent
Payne et al.

(10) Patent No.: US 8,387,378 B2
(45) Date of Patent: Mar. 5, 2013

(54) HYDRAULIC SYSTEM HAVING AUTOMATED RIDE CONTROL ACTIVATION

(75) Inventors: Wesley Thomas Payne, Plainfield, IL (US); Eric Alexander Rost, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 927 days.

(21) Appl. No.: 12/219,821

(22) Filed: Jul. 29, 2008

(65) Prior Publication Data

US 2010/0024411 A1 Feb. 4, 2010

(51) Int. Cl.
*F16D 31/02* (2006.01)

(52) U.S. Cl. .............................................. 60/469; 91/35

(58) Field of Classification Search .................... 60/469; 91/35

See application file for complete search history.

(56) References Cited

U.S. PATENT DOCUMENTS

| | | | | |
|---|---|---|---|---|
| 5,132,665 | A * | 7/1992 | Hutchisson et al. | 340/466 |
| 5,390,121 | A | 2/1995 | Wolfe | |
| 5,467,280 | A | 11/1995 | Kimura | |
| 5,520,499 | A * | 5/1996 | Ufheil et al. | 60/413 |
| 5,733,095 | A | 3/1998 | Palmer et al. | |
| 5,765,115 | A | 6/1998 | Ivan | |
| 5,897,287 | A | 4/1999 | Berger et al. | |
| 6,144,907 | A | 11/2000 | Shibuya et al. | |
| 6,202,011 | B1 | 3/2001 | Jeon | |
| 6,502,837 | B1 | 1/2003 | Hamilton et al. | |
| 6,634,653 | B2 | 10/2003 | Chatterjea | |
| 6,655,136 | B2 | 12/2003 | Holt et al. | |
| 6,959,968 | B2 | 11/2005 | Bale et al. | |
| 7,194,856 | B2 | 3/2007 | Ma et al. | |
| 7,318,595 | B2 | 1/2008 | Lamela et al. | |
| 7,353,097 | B2 | 4/2008 | Bale et al. | |

* cited by examiner

*Primary Examiner* — F. Daniel Lopez

(74) *Attorney, Agent, or Firm* — Finnegan, Henderson, Farabow, Garrett & Dunner LLP

(57) ABSTRACT

A hydraulic system for a mobile machine having an implement is disclosed. The hydraulic system may have a hydraulic actuator configured to move the implement, a storage device configured to store pressurized fluid, and a valve operable to fluidly communicate the storage device with the hydraulic actuator. The hydraulic system may also have a sensor associated with the mobile machine to generate a signal indicative of a speed of the mobile machine, and a controller in communication with the valve and the sensor. The controller may be configured to compare the speed of the mobile machine to a setpoint and to determine an amount of time elapsed while the speed of the mobile machine exceeds the setpoint. The controller may further be configured to selectively operate the valve to fluidly communicate the storage device with the actuator based on the elapsed amount of time and the speed to cushion movement of the implement.

19 Claims, 4 Drawing Sheets

HYDRAULIC SYSTEM HAVING AUTOMATED RIDE CONTROL ACTIVATION

TECHNICAL FIELD

The present disclosure relates generally to a hydraulic system, and more particularly, to a hydraulic system having automated ride control activation.

BACKGROUND

Machines such as, for example, dozers, loaders, excavators, motor graders, and other types of heavy equipment use hydraulic actuators coupled to a work implement for manipulation of a load. Such machines generally do not include shock absorbing systems and, thus, may pitch, lope, or bounce upon encountering uneven or rough terrain. The substantial inertia of the work implement and associated load tends to exacerbate these movements, resulting in increased wear of the machine and discomfort for the operator.

One method of reducing the magnitude of the movements attributable to the work implement and associated load is described in U.S. Pat. No. 7,194,856 (the '856 patent) issued to Ma et al. on Mar. 27, 2007. The '856 patent describes a machine hydraulic system having a reservoir configured to hold a supply of fluid, a source of pressurized fluid, and an actuator situated to move an implement of the machine. A plurality of valves are disposed between the actuator and the reservoir and source to regulate flows of fluid to and from the actuator to move the actuator and connected implement. The hydraulic system also includes an accumulator selectively communicated with the actuator to cushion movement of the actuator and implement.

The accumulator of the '856 patent can be communicated with the actuator to cushion movements of the implement when a ride control mode of operation is activated. The ride control mode of operation can either be manually activated or automatically activated in response to one or more input. For example, a button, switch, or other operator control device may be associated with an operator station of the machine and, when manually engaged by an operator, the operator control device can cause the ride control mode of operation to be activated. Conversely, a controller may receive input indicative of a travel speed of the machine, a loading condition of the machine, a position or orientation of the implement, or other such input, and automatically enter the ride control mode of operation based on the input.

Although the ride control system of the '856 patent may reduce undesired movements of a machine's implement, it may be less than optimal. Specifically, the hydraulic system of the '856 patent may be caused to enter and exit the ride control mode of operation too often. As a result, components of the hydraulic system may wear prematurely.

The disclosed hydraulic system is directed to overcoming one or more of the problems set forth above and/or other problems of the prior art.

SUMMARY

In one aspect, the present disclosure is directed to a hydraulic system for a mobile machine having an implement. The hydraulic system may include a hydraulic actuator configured to move the implement, a storage device configured to store, pressurized fluid, and a valve operable to fluidly communicate the storage device with the hydraulic actuator. The hydraulic system may also include a sensor associated with the mobile machine to generate a signal indicative of a speed of the mobile machine, and a controller in communication with the valve and the sensor. The controller may be configured to compare the speed of the mobile machine to a setpoint and to determine an amount of time elapsed during which the speed of the mobile machine exceeds the setpoint. The controller may further be configured to selectively operate the valve to fluidly communicate the storage device with the actuator based on the elapsed amount of time and the speed to cushion movement of the implement.

In another aspect, the present disclosure is directed to a method for controlling motion an implement during travel of a machine. The method may include determining a speed of the machine, comparing the speed of the machine to a setpoint, and determining an amount of time elapsed during which the speed of the machine exceeds the setpoint. The method may further include selectively cushioning movement of the implement based on the elapsed amount of time and the speed of the machine.

DETAILED DESCRIPTION

Figure 1:
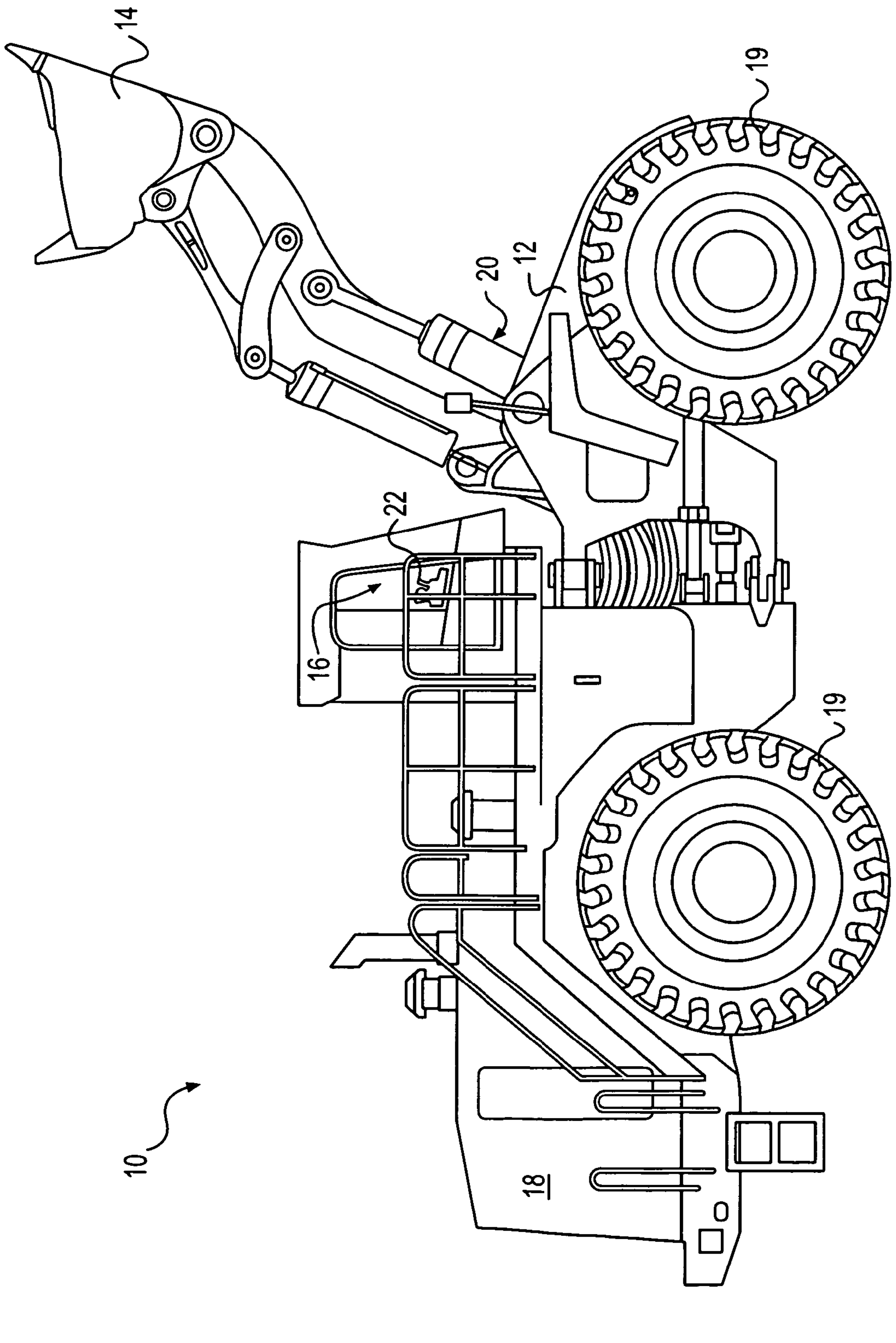
FIG. 1 is a side-view diagrammatic illustration of an exemplary disclosed machine.

FIG. 1 illustrates an exemplary machine 10. Machine 10 may be a mobile machine that performs some type of operation associated with an industry such as mining, construction, farming, transportation, or any other industry known in the art. For example, machine 10 may be an earth moving machine such as a loader, a dozer, an excavator, a backhoe, a motor grader, a dump truck, or any other earth moving machine. Machine 10 may include a frame 12, a work implement 14 movably attachable to frame 12, an operator interface 16 associated with operator control of work implement 14, a power source 18 operatively connected to drive a traction device 19, and one or more hydraulic actuators 20 connected to move work implement 14.

Frame 12 may include any structural member that supports movement of machine 10 and work implement 14. Frame 12 may embody, for example, a stationary base frame connecting power source 18 to work implement 14, a movable frame member of a linkage system, or any other structural member known in the art.

Numerous different work implements 14 may be attachable to a single machine 10 and controllable via operator interface 16. Work implement 14 may include any device used to perform a particular task such as, for example, a bucket, a fork arrangement, a blade, a shovel, a ripper, a dump bed, a broom, a snow blower, a propelling device, a cutting device, a grasping device, or any other task-performing device known in the art. Work implement 14 may be connected to frame 12 of machine 10 via a direct pivot, via a linkage system, or in any other appropriate manner. Work implement 14 may be configured to pivot, rotate, slide, swing, lift, or move relative to machine 10 in any manner known in the art.

Operator interface 16 may be configured to receive input from a machine operator indicative of a desired work implement movement. Specifically, operator interface 16 may include an interface device 22. Interface device 22 may embody, for example, a single- or multi-axis joystick located to one side of an operator station. Interface device 22 may be a proportional-type controller configured to generate signals indicative of desired positions and/or orientations of work implement 14. It is contemplated that additional and/or different interface devices may be included within operator interface 16 such as, for example, wheels, knobs, push-pull devices, switches, buttons, pedals, and other interface devices known in the art.

Power source 18 may embody an engine such as, for example, a diesel engine, a gasoline engine, a gaseous fuel-powered engine such as a natural gas engine, or any other type of engine known in the art. It is contemplated that power source 18 may alternatively embody another source of power such as a fuel cell, a power storage device, an electric or hydraulic motor, or another source of power known in the art.

Traction device 19 may be, for example, a wheel, a belt, a track or any other traction device known in the art. Traction device 19 may be driven by power source 18 to rotate and propel machine 10 in accordance with an output rotation of power source 18.

Figure 2:
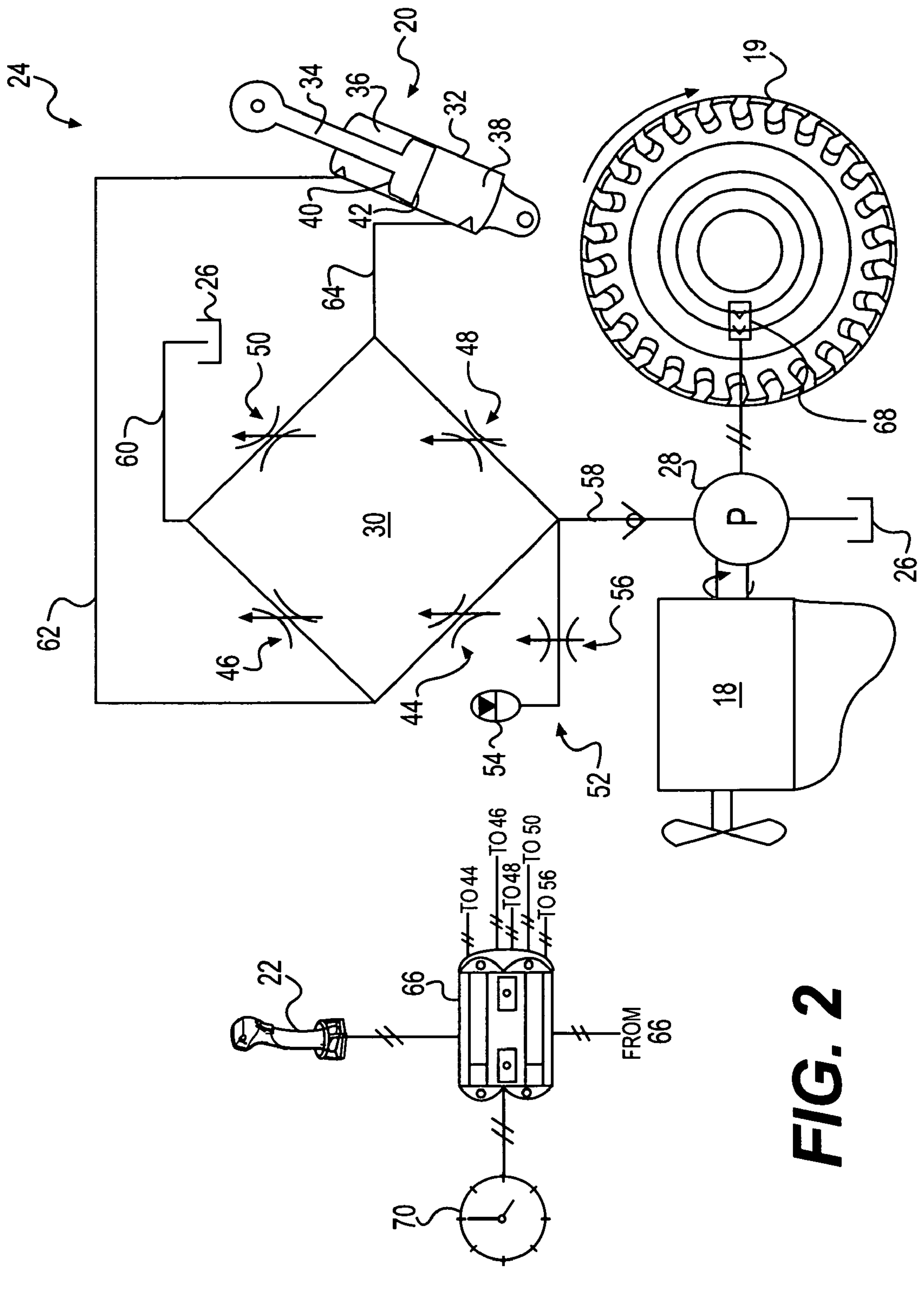
FIG. 2 is a schematic and diagrammatic illustration of an exemplary disclosed hydraulic system that may be used with the machine of FIG. 1.

As illustrated in FIG. 2, machine 10 may include a hydraulic system 24 having a plurality of fluid components that cooperate together to move work implement 14 (referring to FIG. 1). Specifically, hydraulic system 24 may include a tank 26 holding a supply of fluid, and a source 28 driven by power source 18 to draw and pressurize the fluid from tank 26, and to direct the pressurized fluid to hydraulic actuator 20. Hydraulic system 24 may also include a valve arrangement 30 disposed between hydraulic actuator 20 and tank 26 and source 28 to regulate flows of fluid to and from hydraulic actuator 20 that affect movement of work implement 14.

Tank 26 may constitute a reservoir configured to hold a supply of fluid. The fluid may include, for example, a dedicated hydraulic oil, an engine lubrication oil, a transmission lubrication oil, or any other fluid known in the art. One or more hydraulic systems within machine 10 may draw fluid from and return fluid to tank 26. It is also contemplated that hydraulic system 24 may be connected to multiple separate fluid tanks, if desired.

Source 28 may be configured to produce a flow of pressurized fluid and may embody a pump such as, for example, a variable displacement pump, a fixed displacement variable delivery pump, a fixed displacement fixed delivery pump, or any other suitable source of pressurized fluid. Source 28 may be drivably connected to power source 18 of machine 10 by, for example, a countershaft, a belt (not shown), an electrical circuit (not shown), or in any other appropriate manner. It is contemplated that multiple sources of pressurized fluid may alternatively be interconnected to supply pressurized fluid to hydraulic system 24, if desired.

Hydraulic actuator 20 may embody a fluid cylinder that connects work implement 14 to frame 12 via a direct pivot, via a linkage system with hydraulic actuator 20 acting as a member of the linkage system (shown in FIG. 1), or in any other appropriate manner. It is contemplated that a hydraulic actuator other than a fluid cylinder may alternatively be implemented within hydraulic system 24 such as, for example, a hydraulic motor or another appropriate hydraulic actuator.

As illustrated in FIG. 2, hydraulic actuator 20 may include a tube 32 and a piston assembly 34 disposed within tube 32. One of tube 32 and piston assembly 34 may be pivotally connected to frame 12, while the other of tube 32 and piston assembly 34 may be pivotally connected to work implement 14. It is contemplated that tube 32 and/or piston assembly 34 may alternatively be fixedly connected to either frame 12 or work implement 14, if desired. Tube 32 may be divided into a rod chamber 36 and a head chamber 38 by piston assembly 34. Rod and head chambers 36, 38 may be selectively supplied with pressurized fluid from source 28 and selectively connected with tank 26 to cause piston assembly 34 to displace within tube 32, thereby changing an effective length of hydraulic actuator 20. The expansion and retraction of hydraulic actuator 20 may function to assist in moving work implement 14.

Piston assembly 34 may include a first hydraulic surface 40 and a second hydraulic surface 42 opposite first hydraulic surface 40. An imbalance of force caused by fluid pressure acting on first and second hydraulic surfaces 40, 42 may result in movement of piston assembly 34 within tube 32. For example, a force resulting from fluid pressure acting on first hydraulic surface 40 being greater than a force resulting from fluid pressure acting on second hydraulic surface 42 may cause piston assembly 34 to retract within tube 32 to decrease the effective length of hydraulic actuator 20. Similarly, when a force caused by fluid pressure acting on second hydraulic surface 42 is greater than a force caused by fluid pressure acting on first hydraulic surface 40, piston assembly 34 may displace and increase the effective length of hydraulic actuator 20. A flow rate of fluid into and out of rod and head chambers 36, 38 may affect a velocity of hydraulic actuator 20, while a pressure of the fluid in contact with first and second hydraulic surfaces 40, 42 may affect an actuation force of hydraulic actuator 20. A sealing member (not shown), such as an o-ring, may be connected to piston assembly 34 to restrict a flow of fluid between an internal wall of tube 32 and an outer cylindrical surface of piston assembly 34.

Valve arrangement 30 may include one or more valves configured to perform supply and drain functions associated with the head and a rod chambers 36, 38 of hydraulic actuator 20. In the embodiment of FIG. 2, valve arrangement 30 includes a rod-end supply valve 44, a rod-end drain valve 46, a head-end supply valve 48, and a head-end drain valve 50. However, it is contemplated that a different configuration including a greater or lesser number of valves may alternatively be utilized to perform the functions of valve arrangement 30, if desired. For example, in a second embodiment (not shown), valve arrangement 30 could alternatively comprise only two valves, including a single head-end valve and a single rod-end valve that perform both supply and drain functions. In a third embodiment (not shown), valve arrangement 30 could alternatively include a single valve capable of performing supply and drain functions for both the rod and head chambers 36, 38 of hydraulic actuator 20. Although other valve arrangement embodiments may be possible, only the first embodiment of valve arrangement 30 shown in FIG. 2 will be described in detail.

Rod-end supply valve 44 may be disposed between source 28 and rod chamber 36 and configured to regulate a flow of pressurized fluid directed to rod chamber 36 in response to a commanded velocity. In one example, rod-end supply valve 44 may be an independent metering valve (IMV) having a proportional spring-biased valve element (not shown) that is solenoid actuated and configured to move between a first position, at which fluid flow is blocked from rod chamber 36, and a second position, at which fluid is allowed to flow into rod chamber 36. The valve element of rod-end supply valve 44 may be movable to any position between the first and second positions to vary the rate of flow into rod chamber 36, thereby affecting the velocity of hydraulic actuator 20.

Rod-end drain valve 46 may be disposed between rod chamber 36 and tank 26 and configured to regulate a flow of fluid from rod chamber 36 to tank 26 in response to the commanded velocity. In one example, rod-end drain valve 46 may be an IMV having a proportional spring-biased valve element that is solenoid actuated and configured to move between a first position, at which fluid is blocked from flowing from rod chamber 36, and a second position, at which fluid is allowed to flow from rod chamber 36. The valve element of rod-end drain valve 46 may be movable to any position between the first and second positions to vary the rate of flow from rod chamber 36, thereby affecting the velocity of hydraulic actuator 20.

Head-end supply valve 48 may be disposed between source 28 and head chamber 38 and configured to regulate a flow of pressurized fluid to head chamber 38 in response to the commanded velocity. Specifically, head-end supply valve 48 may be an IMV having a proportional spring-biased valve element configured to move between a first position, at which fluid is blocked from head chamber 38, and a second position, at which fluid is allowed to flow into head chamber 38. The valve element of head-end supply valve 48 may be movable to any position between the first and second positions to vary the rate of flow into head chamber 38, thereby affecting the velocity of hydraulic actuator 20.

Head-end drain valve 50 may be disposed between head chamber 38 and tank 26 and configured to regulate a flow of fluid from head chamber 38 to tank 26 in response to the commanded velocity. Specifically, head-end drain valve 50 may be an IMV having a proportional spring-biased valve element configured to move between a first position, at which fluid is blocked from flowing from head chamber 38, and a second position, at which fluid is allowed to flow from head chamber 38. The valve element of head-end drain valve 50 may be movable to any position between the first and second positions to vary the rate of flow from head chamber 38, thereby affecting the velocity of hydraulic actuator 20.

Hydraulic system 24 may also include a ride control arrangement 52 configured to dampen unintended movements of work implement 14 (i.e., movements not requested by the operator of machine 10 via interface device 22) during travel of machine 10. Ride control arrangement 52 may include an accumulator 54 and an accumulator valve 56. Accumulator valve 56 may be operable to selectively allow pressurized fluid into and/or out of accumulator valve 56.

Accumulator 54 may be selectively communicated with head chamber 38 by way of accumulator valve 56 to selectively receive pressurized fluid from and direct pressurized fluid to hydraulic actuator 20. In particular, accumulator 54 may be a pressure vessel or other storage device filled with a compressible gas and configured to store pressurized fluid for future use as a source of fluid power. The compressible gas may include, for example, nitrogen or another appropriate compressible gas. As fluid within head chamber 38 exceeds a predetermined pressure while accumulator valve 56 and head-end supply valve 48 are in a flow passing positions, fluid from head chamber 38 and/or source 28 may flow into accumulator 54. Because the nitrogen gas is compressible, it may act like a spring and compress as the fluid flows into accumulator 54. When the pressure of the fluid within head chamber 38 then drops below a predetermined pressure while accumulator valve 56 and head-end supply valve 48 are in the flow passing positions, the compressed nitrogen within accumulator 54 may urge the fluid from within accumulator 54 back into head chamber 38.

To help smooth out pressure oscillations within hydraulic actuator 20, hydraulic system 24 may absorb some energy from the fluid as the fluid flows between head chamber 38 and accumulator 54. The damping mechanism that accomplishes this may include a restrictive orifice disposed within either accumulator valve 56, or within a fluid passageway between accumulator 54 and head chamber 38. Each time work implement 14 moves in response to travel across uneven terrain, fluid may be squeezed through the restrictive orifice, and the energy expended to force the oil through the restrictive orifice may be converted into heat, which may then be dissipated from hydraulic system 24. This dissipation of energy from the fluid may essentially absorb the bouncing energy, making for a smoother ride of machine 10.

Accumulator valve 56, in one example, may be disposed in parallel with head-end supply valve 48, and between accumulator 54 and head chamber 38. Accumulator valve 56 may be configured to regulate the flows of pressurized fluid between accumulator 54 and head chamber 38 in response to a ride control command. Specifically, accumulator valve 56 may be an IMV having a proportional spring-biased valve element configured to move between a first position, at which fluid is blocked from flowing between head chamber 38 and accumulator 54, and a second position, at which fluid is allowed to flow between head chamber 38 and accumulator 54. When in a ride control mode of operation (i.e., when the ride control command has been issued), it is contemplated that instead of a fixed restrictive orifice, the valve element of accumulator valve 56 may instead be controllably moved to any position between the flow passing and the flow blocking positions to vary the restriction and associated rate of fluid flow between head chamber 38 and accumulator 54, thereby affecting the cushioning of hydraulic actuator 20 during travel of machine 10.

Rod- and head-end supply and drain valves 44-50 and accumulator valve 56 may be fluidly interconnected. In particular, rod- and head-end supply valves 44, 48 may be connected in parallel to a common supply passageway 58 extending from source 28. Rod- and head-end drain valves 46, 50 may be connected in parallel to a common drain passageway 60 leading to tank 26. Rod-end supply and drain valves 44, 46 may be connected to a common rod chamber passageway 62 for selectively supplying and draining rod chamber 36 in response to velocity commands. Similarly, head-end supply and drain valves 48, 50 may be connected to a common head chamber passageway 64 for selectively supplying and draining head chamber 38 in response to the velocity commands.

Hydraulic system 24 may further include a controller 66 in communication with the other components of hydraulic system 24. Controller 66 may embody a single microprocessor or multiple microprocessors that include a means for controlling an operation of hydraulic system 24. Numerous commercially available microprocessors can be configured to perform the functions of controller 66. It should be appreciated that controller 66 could readily embody a general machine microprocessor capable of controlling numerous machine functions. Controller 66 may include a memory, a secondary storage device, a processor, and any other components for running an application. Various other circuits may be associated with controller 66 such as power supply circuitry, signal conditioning circuitry, solenoid driver circuitry, and other types of circuitry.

One or more maps relating interface device position and command velocity information for valve arrangement 30 and/or ride control arrangement 52 may be stored in the memory of controller 66. Each of these maps may be in the form of a table, a map, an equation, or in another suitable form. The relationship maps may be automatically or manually selected and/or modified by controller 66 to affect actuation of hydraulic actuator 20.

Controller 66 may be configured to receive input from interface device 22 and command a velocity for hydraulic actuator 20 in response to the input. Specifically, controller 66 may be in communication with rod- and head-end supply and drain valves 44-50 of hydraulic actuator 20 and with interface device 22. Controller 66 may receive the interface device position signal from interface device 22, and reference the selected and/or modified relationship maps stored in the memory of controller 66 to determine command velocity values. These velocity values may then be commanded of hydraulic actuator 20 causing rod- and head-end supply and drain valves 44-50 to selectively fill or drain rod and head chambers 36, 38 associated with hydraulic actuator 20 to produce the desired movement of work implement 14.

Controller 66 may also be configured to initiate the ride control mode of operation. In particular, controller 66 may either be manually switched to the ride control mode of operation or may automatically enter the ride control mode of operation in response to one or more inputs. For example, a button, switch, or other operator control device (not shown) may be associated with the operator station that, when manually engaged by a machine operator, causes controller 66 to enter the ride control mode of operation. Conversely, controller 66 may automatically enter the ride control mode of operation based one or more measured inputs, as will be described in more detail below. When in the ride control mode of operation, controller 66 may cause the valve elements of rod-end supply valve 44 and head-end drain valve 50 to move to or remain in the flow blocking positions. Controller 66 may simultaneously or subsequently move the valve elements of rod-end drain valve 46, head-end supply valve 48, and accumulator valve 56 to the flow passing positions. As described above, accumulator valve 56 may be moved to the flow passing position to allow fluid to flow between head chamber 38 and accumulator 54 for absorption of energy from the fluid each time the fluid passes through the restrictive orifice. Head-end supply valve 48 may be moved to the flow passing position to allow fluid flow between accumulator valve 56 and head chamber 38. Rod-end drain valve 46 may be moved to the flow passing position to prevent hydraulic lock during an up-bounce of work implement 14 as fluid is flowing from accumulator 54 into head chamber 38. It is also contemplated that the valve elements of rod-end drain valve 46 and head-end supply valve 48 may be selectively positioned between the flow passing and flow blocking positions to vary the restriction of the fluid exiting and/or entering rod and head chambers 36, 38, thereby adjusting dampening during the ride control mode of operation. To minimize undesired movement of work implement 14 upon initiation of the ride control mode of operation, the pressure of the fluid within accumulator 54 may be substantially matched to the pressure within head chamber 38 in a conventional manner, before fluid communication between accumulator 54 and head chamber 38, if desired.

One or more sensors 68 and a timer 70 may be associated with controller 66 to facilitate precise control of ride control arrangement 52. Sensor 68 may be located to monitor a speed of machine 10, for example a rotational speed of traction device 19 or a travel speed of machine 10. Sensor 68 may generate a signal indicative of the speed measurement and send this signal to controller 66. Timer 70 may be a digital or analog type device configured to track a time elapsed since machine 10 begins operation, a time elapsed since a travel speed of machine 10 exceeds a setpoint, a time elapsed since machine 10 enters a ride control mode of operation, or any other similar time measurement. Timer 70 may generate a signal indicative of the time measurement and send this signal to controller 66.

Figure 3:
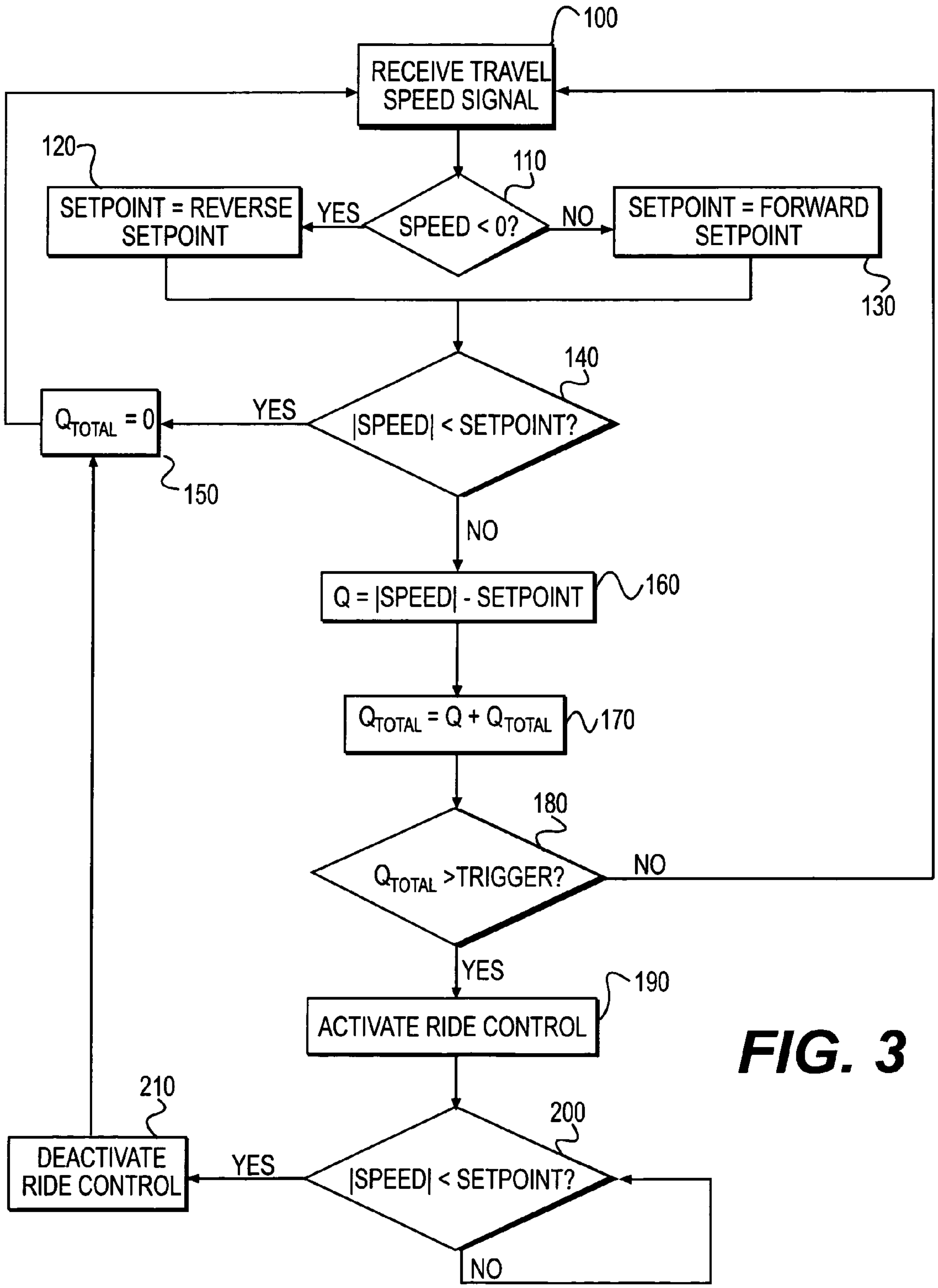
FIG. 3 is a flowchart depicting an exemplary disclosed operation that may be performed by the hydraulic system of FIG. 2.
Figure 4:
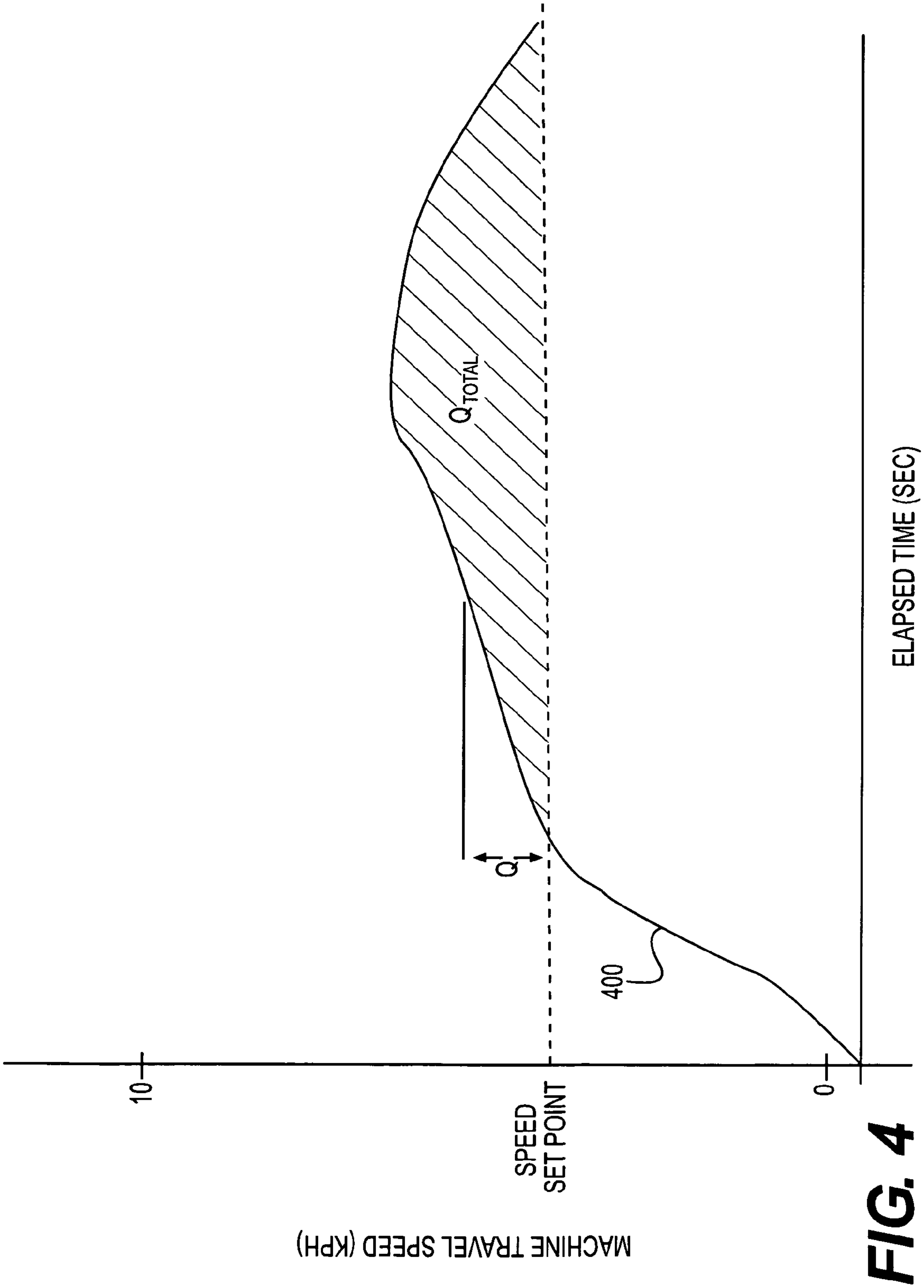
FIG. 4 is a graph associated with performance of the operation of FIG. 3.

FIG. 3 illustrates an operation performed by controller 66 during activation of the ride control mode of operation, and FIG. 4 is a graph associated with performance of the operation. FIGS. 3 and 4 will be described in detail in the following section to further illustrate the disclosed concepts.

INDUSTRIAL APPLICABILITY

The disclosed hydraulic system may be applicable to any mobile machine that includes a hydraulic actuator connected to a work implement. The disclosed hydraulic system may improve a ride control mode of operation by minimizing undesired activations that can attribute to accelerated wear of the hydraulic system. The operation of hydraulic system 24 will now be explained.

During operation of machine 10, a machine operator may manipulate interface device 22 to control a movement of work implement 14. The actuation position of interface device 22 may be related to an operator expected or desired velocity of work implement 14. Interface device 22 may generate a position signal indicative of the operator expected or desired velocity and send this position signal to controller 66.

Controller 66 may be configured to determine a command velocity for hydraulic actuator 20 that results in the operator expected or desired velocity. Specifically, controller 66 may be configured to receive the interface device position signal and to compare the interface device position signal to the relationship map stored in the memory of controller 66 to determine an appropriate velocity command signal. Controller 66 may then send the velocity command signal to rod- and head-end supply and drain valves 44-50 to regulate the flow of pressurized fluid into and out of rod and head chambers 36, 38, thereby causing movement of hydraulic actuator 20 that substantially matches the operator expected or desired velocity.

Accumulator 54 and accumulator valve 56 may be used during the ride control mode of operation. Specifically, when controller 66 either automatically enters or is manually caused to enter the ride control mode of operation, controller 66 may move the valve elements of rod-end supply valve 44 and head-end drain valve 50 to the flow blocking positions (or retain them in the flow blocking positions if already in the flow blocking positions) and move the valve elements of accumulator valve 56, head-end supply valve 48, and rod-end drain valve 46 to the flow passing positions. When in the ride control mode of operation, fluid may be allowed to drain from rod chamber 36 and flow into and out of head chamber 38. As fluid both leaves rod chamber 36 and flows into and out of head chamber 38, the fluid flow may be restricted to absorb and dissipate bounce energy from the movement of work implement 14.

Controller 66 may automatically activate the ride control mode of operation based on signals received from sensor 68 and timer 70. Specifically, as illustrated in the flowchart of FIG. 3, the first step in the automatic activation operation may include receiving the travel speed signal from sensor 68 (Step 100). Controller 66 may then compare the travel speed of machine 10, as indicated by the travel speed signal, to a reference value, for example zero, to determine if the travel direction of machine 10 is in a forward or a reverse direction (Step 110). If the travel speed of machine 10 is positive (i.e., greater than zero), the travel direction is assumed to be forward. If the travel speed is negative (i.e., less than zero), the travel direction is assumed to be reverse.

Based on the travel direction of machine 10, controller 66 may determine a setpoint for subsequent comparison with the travel speed of machine 10. Specifically, if the travel of machine 10 is determined to be in a reverse direction, the setpoint may be made equal to a reverse setpoint value (Step 120). If the travel of machine 10 is determined to be in a forward direction, the setpoint is made equal to a forward setpoint (Step 130). In one embodiment, the forward setpoint value may be about three times greater than the reverse setpoint value. For example, for a reverse setpoint value of about 3 kph, and more specifically about 3.2 kph, the forward setpoint may be about 10 kph, and more specifically about 9.7 kph. Generally, both the forward and reverse setpoint values may be maintained within the range of about 0-10 kph.

After determining the setpoint, controller 66 may compare the absolute value of the travel speed to the setpoint (Step 140). If the absolute value of the travel speed is less than the setpoint, a cumulative value $Q_{TOTAL}$ may be reset (i.e., set to a relatively low value, for example zero) (Step 150). $Q_{TOTAL}$ may be related to an amount of time elapsed since the travel speed exceeds and remains greater than the setpoint and to the instantaneous value of the travel speed (i.e., $Q_{TOTAL}$ may be about equal to an integral of the travel speed with respect to time, after the travel speed has exceed and remains greater than the setpoint). It is contemplated that, instead of comparing the absolute value of the travel speed to the setpoint, another value offset from the setpoint may be used for this comparison, if desired. After completion of step 150, control may return to Step 100.

If the absolute value of the travel speed is not less than the setpoint (i.e., if the travel speed is greater than the setpoint), a value Q may be set equal to the difference between the absolute value of the travel speed and the setpoint (i.e., $Q=|speed|-setpoint$) (Step 160). The value Q may then be added to the value $Q_{TOTAL}$ to calculate a new $Q_{TOTAL}$ (i.e., the travel speed may be integrated with respect to the amount of time elapsed since the travel speed exceeds the setpoint) (Step 170). This operation can be visualized by observing the graph of FIG. 4.

In FIG. 4, a curve 400 may represent the travel speed of machine 10 tracked over a period of time. As the travel speed of machine 10 increases, it may eventually exceed the setpoint selected for the current travel direction. The dashed horizontal line in FIG. 4 may represent the selected setpoint. Once the travel speed exceeds the setpoint (i.e., once curve 400 cross the dashed line), controller 66 may begin calculating the area beneath curve 400 and above the dashed line. This area may be about equal to $Q_{TOTAL}$ and is represented by the hatched area in FIG. 4, while the vertical distance between curve 400 and the dashed line may be about equal to Q. Controller 66 may continuously compare the hatched area beneath curve 400 and above the dashed line to a trigger amount (i.e., controller 66 may continuously compare $Q_{TOTAL}$ to the trigger amount) (Step 180, referring back to FIG. 3). If $Q_{TOTAL}$ is less than the trigger amount, control may return to step 100. In one example, the trigger amount may be about equal to 1-2000 kph-sec. However, it is contemplated that the trigger amount may vary based on a type and an application of machine 10, if desired.

However, once the area between curve 400 and the dashed line exceeds a trigger amount (i.e., once $Q_{TOTAL}$ is greater than the trigger amount), controller 66 may activate the ride control mode of operation (i.e., controller 66 may open fluid communication between accumulator 54 and head chamber 38) (Step 190). After activation, the ride control mode of operation may remain in affect until the travel speed of machine 10 falls below the setpoint or until an operator manually indicates a desire to end the ride control mode of operation. Thus, controller 66 may continuously compare the absolute value of the travel speed to the setpoint (Step 200) and, as long as the absolute value of the travel speed remains greater than the setpoint, control may continuously cycle through step 200. However, when the absolute value of the travel speed falls below the setpoint, controller 66 may deactivate the ride control mode of operation (i.e., controller 66 may operate head end supply valve 48 and/or accumulator valve 56 to inhibit fluid communication between accumulator 54 and head chamber 38) (Step 210). It is contemplated that, in some embodiments, controller 66 may delay the deactivation of the ride control mode of operation for a period of time following the reduction of the travel speed below the setpoint, if desired. In one example, the delay may be about 0-5 sec. After completion of step 210, control may return to step 100.

Because the disclosed ride control mode of operation may be selectively and automatically activated based on both a travel speed and an elapsed amount of time since the travel speed exceeds the setpoint, the frequency of activation and deactivation events may be reduced, while still providing adequate cushioning of work implement 14. And, a reduction in the activation/deactivation of the ride control mode of operation may help extend the component life of hydraulic system 24.

It will be apparent to those skilled in the art that various modifications and variations can be made to the disclosed hydraulic system. Other embodiments will be apparent to those skilled in the art from consideration of the specification and practice of the disclosed hydraulic system. It is intended that the specification and examples be considered as exemplary only, with a true scope being indicated by the following claims and their equivalents.

What is claimed is:

1. A hydraulic system for a mobile machine having an implement, the hydraulic system comprising:
- a hydraulic actuator configured to move the implement;
- a storage device configured to store pressurized fluid;
- a valve operable to fluidly communicate the storage device with the hydraulic actuator;
- a sensor associated with the mobile machine to generate a signal indicative of a speed of the mobile machine; and
- a controller in communication with the valve and the sensor, the controller being configured to:
  - determine when the speed is associated with a forward or reverse travel direction of the mobile machine based on signals received from the sensor;
  - compare the speed of the mobile machine to a setpoint;
  - determine an amount of time elapsed during which the speed of the mobile machine exceeds the setpoint; and
  - selectively operate the valve to fluidly communicate the storage device with the hydraulic actuator based on the elapsed amount of time, the travel direction, and the speed to cushion movement of the implement.

2. The hydraulic system of claim 1, wherein the controller is configured to communicate with the valve to inhibit communication between the storage device and the hydraulic actuator when the speed of the mobile machine drops below the setpoint.

3. The hydraulic system of claim 2, wherein the controller is configured to communicate with the valve to delay inhibiting of communication between the storage device and the hydraulic actuator for an amount of time after the speed of the mobile machine drops below the setpoint.

4. The hydraulic system of claim 3, wherein the delayed amount of time is about 0-5 sec.

5. The hydraulic system of claim 4, wherein the controller is further configured to:

change the setpoint based on a travel direction of the mobile machine.

6. The hydraulic system of claim 5, wherein the setpoint associated with forward travel of the mobile machine is about three times the setpoint associated with reverse travel of the mobile machine.

7. The hydraulic system of claim 6, wherein the setpoint associated with forward travel of the mobile machine is about 10 kph.

8. The hydraulic system of claim 1, wherein the controller is configured to integrate the speed with respect to time and to selectively operate the valve to fluidly communicate the storage device with the hydraulic actuator when a value of the integration exceeds a trigger amount.

9. The hydraulic system of claim 8, wherein the trigger amount is about 0-1000 kph-sec.

10. The hydraulic system of claim 8, wherein the value of the integration is reset when the speed of the mobile machine drops below the setpoint.

11. The hydraulic system of claim 1, further including:

a reservoir configured to hold a supply of fluid;

a source configured to draw and pressurize fluid from the reservoir; and a valve arrangement configured to selectively communicate the hydraulic actuator with the reservoir and the source to affect movement of the implement, wherein the controller is further configured to operate the valve arrangement in response to operator input.

12. The hydraulic system of claim 11, wherein the hydraulic actuator includes a first chamber and a second chamber separated by a piston assembly, and the controller is configured to communicate with the valve arrangement to fluidly communicate one of the first and second chambers with the reservoir when the storage device is fluidly communicated with the other of the first and second chambers.

13. A method for controlling motion of an implement during travel of a machine, the method comprising:

determining a speed of the machine;

determining when the speed is associated with a forward or reverse travel direction of the machine;

comparing the speed of the machine to a setpoint;

determining an amount of time elapsed during which the speed of the machine exceeds the setpoint; and selectively cushioning movement of the implement based on the elapsed amount of time, the travel direction, and the speed of the machine.

14. The method of claim 13, wherein selectively cushioning includes communicating stored pressurized fluid with an actuator connected to the implement.

15. The method of claim 14, further including inhibiting communication of the stored pressurized fluid with the actuator when the speed of the machine drops below the setpoint.

16. The method of claim 15, wherein the inhibiting is delayed for an amount of time after the speed of the machine drops below the setpoint.

17. The method of claim 13, wherein:

the speed is a travel speed of the machine; and the method further includes:

and changing the setpoint based on a travel direction of the machine.

18. The method of claim 13, further including integrating the speed with respect to time and selectively cushioning movement of the implement when a value of the integration exceeds a trigger amount, wherein the value of the integration is reset when the speed of the machine drops below the setpoint.

19. A machine, comprising:

a power source;

a traction device driven by the power source to propel the machine;

a sensor configured to generate a signal indicative of a speed of the traction device;

an implement;

a hydraulic actuator configured to move the implement; a reservoir configured to hold a supply of fluid;

a source driven by the power source to draw and pressurize fluid from the reservoir;

a valve arrangement configured to selectively communicate the hydraulic actuator with the reservoir and the source to affect movement of the implement; an accumulator configured to store pressurized fluid;

a valve operable to fluidly communicate the accumulator with the hydraulic actuator; and a controller in communication with the valve arrangement, the valve, and the sensor, the controller being configured to:

operate the valve arrangement to affect movement of the hydraulic actuator and the implement based on operator input;

compare the travel speed to a setpoint;

integrate the speed with respect to time while the speed exceeds the setpoint; and selectively operate the valve to fluidly communicate the accumulator with the hydraulic actuator based on a value of the integration to cushion movement of the implement.

* * * * *